United States Patent [19]

Traupe

[11] 3,955,836

[45] May 11, 1976

[54] OUTLET FOR UNDERFLOOR AND CONCEALED INSTALLATIONS

[76] Inventor: Hans-Martin Traupe, Frenssenstr. 51, 2 Hamburg 55, Germany

[22] Filed: Jan. 25, 1974

[21] Appl. No.: 436,653

[30] Foreign Application Priority Data

Jan. 26, 1973 Germany..................... 7302905[U]

[52] U.S. Cl................................ 285/208; 52/221; 279/41 R; 285/216; 285/321; 285/403; 292/256.63
[51] Int. Cl.²........................................... F16L 5/00
[58] Field of Search ........... 285/201, 205, 206, 207, 285/208, 111, 162, 196, 338, 346, 370, 210, 379, 397, 321, 398, 421, 216, 403, DIG. 7, 215; 279/41, 2; 138/89; 292/256.63, 256.67; 52/221

[56] References Cited
UNITED STATES PATENTS

| 259,369 | 6/1882 | Clay et al....................... 285/379 X |
|---|---|---|
| 3,148,902 | 9/1964 | Gardner, Sr. et al........... 285/421 X |
| 3,701,837 | 10/1972 | Fork ................................. 52/221 X |

FOREIGN PATENTS OR APPLICATIONS

| 2,199 | 2/1886 | United Kingdom............ 285/DIG. 7 |
|---|---|---|
| 448,639 | 12/1967 | Switzerland......................... 285/216 |
| 1,165,590 | 6/1958 | France.............................. 285/403 |
| 1,478,931 | 3/1967 | France.............................. 285/216 |

Primary Examiner—Werner H. Schroeder
Assistant Examiner—Moshe I. Cohen
Attorney, Agent, or Firm—Walter Becker

[57] ABSTRACT

An outlet for underfloor and concealed installations for insertion into a tubular opening in concrete or flooring finish, which includes a hollow tubular body having its lower outer edge bevelled against which a correspondingly bevelled portion of a split clamping ring is pressed and frictionally held by means of screws.

5 Claims, 2 Drawing Figures

OUTLET FOR UNDERFLOOR AND CONCEALED INSTALLATIONS

The present invention relates to an outlet for underfloor and concealed installations which is confined by a pipe section or an opening in the hardened concrete or flooring finish while a hollow body is located in the pipe section or said opening.

A heretofore known outlet of the general type referred to above comprises a pipe section which is connected to the upper wall or cover of the underfloor passage, into which pipe section is screwed a piece of pipe the end of which that is remote from the passage can be closed by a stopper. With this arrangement, it is necessary that prior to the pouring of the concrete or flooring finish, the upper edge of the piece of pipe which supports the stopper be set to the level of the finished concrete or flooring finish. Since due to the thread, the piece of pipe on the pipe section is adjustable only as to height, the upper edge of the piece of pipe can in particular with pipe sections which are not perpendicular to the concrete or floor finishing surface never be adjusted precisely flush with said surface.

For purposes of simplifying the installation of concealed passages and for purposes of reducing the manufacturing costs thereof, it has furthermore been suggested to provide the passage outlet only after the concrete and/or the flooring finishing has hardened. To this end, openings are milled into the concrete or flooring finish and into the cover for the passage, and hollow bodies are inserted into these openings which confine the outlet for the passage and serve for receiving installation devices such as plugs or the like. These hollow bodies in the form of pieces of pipe are at their lower rim provided with slots and have a wall which narrows inwardly and at the top narrows in a truncated shaped manner. For purposes of connecting these hollow bodies in the openings, a correspondingly shaped ring is inserted into the truncated cone-shaped region. This ring widens the hollow body within the region of the slots and presses against the wall of the opening whereby it will be fastened therein. This hollow body may be inserted into the pipe section of the outlet instead of the piece of pipe. In order to fasten the hollow body safely in the pipe section, it is necessary to place a considerable section of the latter into the hollow body whereby, however, the drawbacks referred to above with regard to a screwed in piece of pipe will not be eliminated.

It is, therefore, an object of the present invention so to design an outlet for underflooring and concealed installations that the outlet may be fastened in openings milled into the hardened concrete and/or flooring finish, as well as in the pipe section arranged on the cover for the passage.

It is a further object of this invention to provide an outlet of the type set forth in the preceding paragraph, which when employed in connection with pipe sections provided on the cover for the passage will permit its upper rim to be aligned easily and precisely with the concrete surface or the surface of the flooring finish prior to pouring the concrete or the flooring finish.

These and other objects and advantages of the present invention will appear more clearly in connection with the following drawings in which.

Figure 1:
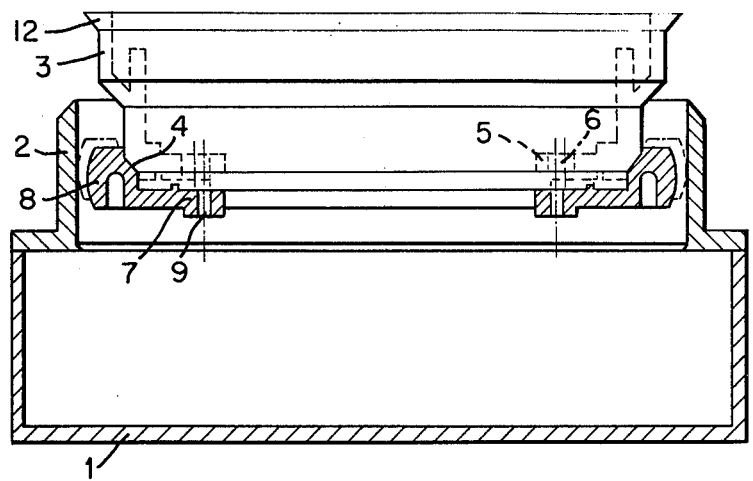
FIG. 1 is a section through an outlet according to the invention, said outlet being inserted into a pipe section formed onto the cover for the passage.
Figure 2:
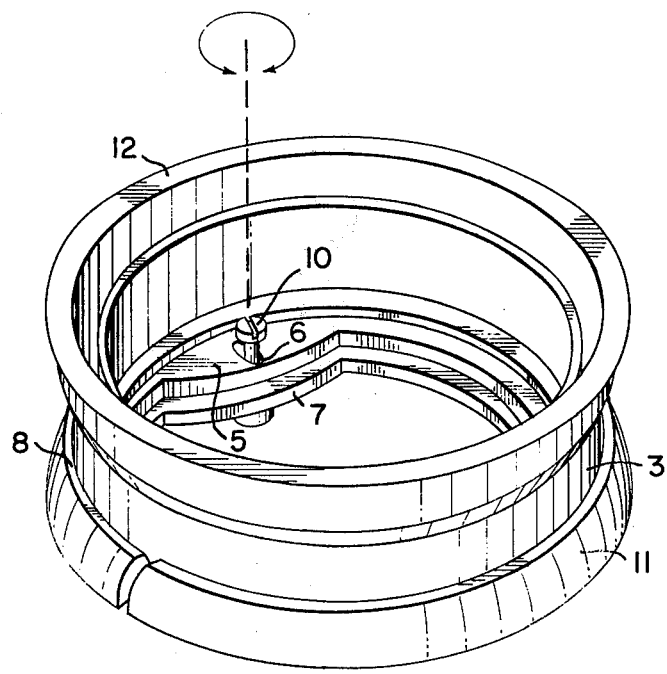
FIG. 2 is a perspective view of the outlet according to FIG. 1.

The outlet for underflooring and concealed installation according to the present invention is characterized primarily in that the lower outer edge of the hollow body inserted into the pipe section is slanted or beveled, and that a split clamping ring 8 having a bulged or convex outer surface is so pressed against said beveled or inclined edge by means of a clamping element engaging the hollow body, that the outer surface will frictionally engage the wall of said pipe section or opening.

With the outlet according to the invention, instead of the piece of pipe screwed into the pipe section of an underfloor passage, the hollow body is together with the clamping ring held thereon inserted into the pipe section. The upper rim of an outlet designed in this manner in conformity with the present invention can easily be aligned with the plane of the concrete surface or the surface of the flooring finish because the bulged or arched outer surface of the clamping ring and the dimensions of the hollow body will in wide limits permit any desired position of the hollow body with regard to the pipe section. After the aligning of the hollow body, for locating and fastening the latter it is merely necessary to press the clamping ring against the inclined lower edge of said hollow body for instance by means of screws, whereby the clamping ring will be spread apart and will frictionally engage the inner wall of the pipe section.

The outlet according to the present invention may also be fastened in openings in concrete and/or flooring finish in the same manner as in pipe sections. These openings are milled into the concrete or flooring finish and in the cover for the passage after the concrete or flooring finish has hardened. In view of the flexible employment of the outlet according to the invention, its manufacturing and stock-keeping costs are considerably lowered inasmuch as for all commercially used diameters of the connecting passages which connect an underfloor or concealed passage with the surface of the wall of the building, the same insert consisting of hollow body and clamping ring can be employed. This has proved particularly advantageous when additional outlets are provided after the underfloor installation has been completed.

According to the preferred embodiment of the invention, the clamping elements consist of extensions provided on the hollow body and the clamping ring, said extensions being adapted to be clamped against each other by means of screws. This embodiment has the additional advantage that the protrusions or screws may simultaneously serve as connecting elements for installation devices or the like.

That rim of the hollow body which points to the concrete surface or the surface of the flooring finish is provided with a flange which engages the concrete or flooring finish and forms a support for preventing a change in position of the hollow body, for instance when the cover or lid closing the same is under a heavy load. It has also proved highly satisfactory to make the clamping ring of resilient material.

Furthermore, the clamping ring may be provided with an outer surface having protrusions or extensions, whereby its adherence to the pipe section or the concrete wall or wall of the flooring finish will be improved.

Referring now to the drawing in detail, prior to the pouring of the concrete or flooring finish, a hollow body 3 is inserted into a pipe section 2 provided on an underfloor passage 1, the lower outer edge 4 being beveled to form a peripheral conical surface diverging from the opposite end and converging toward the axis of said body 3. The edge 4 is engaged by correspondingly shaped surfaces of a split clamping ring 8 of resilient material. The clamping ring 8 has radially inward extensions 7 which likewise point toward the interior of the outlet and which overlie and are spaced from similar formations on the hollow body 3 and each of which has a bore 9 in which a non-illustrated screw nut is fastened. The clamping ring 8 is drawn toward and held on the hollow body 3 by means of screws 10 which extend through the oblong hole 6 and threadedly engage the screw nuts of bore 9.

After the upper edge of the hollow body 3 has been aligned with the surface of the concrete or flooring finish, it is merely necessary for connecting said hollow body in the pipe section 2 to clamp the extensions 5 and 7 on the hollow body 3 and clamping ring 8 against each other by means of screws 10. As a result thereof, the clamping ring 8 slides upwardly on said beveled edge and is widened so that its outer surface 11 is pressed against the wall of the pipe section 2 as illustrated by dash lines in FIG. 1. The connection in the aligned position is furthermore facilitated by the fact that the clamping ring 8 has an arched or convex outer surface 11, which may also be knurled.

The upper end of the hollow body 3 is provided with a flange 12 which supports the aligned hollow body 3 on the concrete or flooring finish cast therearound, in order to prevent hollow body 3 from being pressed into the pipe section 2 for instance of a cover or lid closing the upper opening of the hollow body 3 is, for instance, subjected to an undue load.

For connecting non-illustrated installation devices, the extensions 5 on the hollow body 3 may be used.

It is, of course, to be understood that the present invention is, by no means, limited to the specific showing in the drawing but also comprises any modifications within the scope of the appended claims.

What I claim is:

1. An outlet for insertion into a tubular opening for underfloor and concealed installations, which includes a tubular body having one end formed with a peripheral conical surface diverging in the direction toward the opposite end and converging toward the axis of said tubular body in the opposite direction, a split clamping ring in engagement with said conical surface and formed with a radially extending periphery having a greater diameter than the diameter of said tubular body, radially inwardly extending overlying formations on said tubular body and said split clamping ring normally spaced apart in the normal condition of said ring, and means to draw said extensions toward each other to move said split ring on said conical surface toward said opposite end and expand said split ring, so that said ring will engage the wall of a tubular opening in which said tubular body is inserted, with said tubular body adjustable both axially and angularly to conform to the surface of the structure in which said tubular opening is provided.

2. An outlet in combination according to claim 1, in which said overlying formations respectively arranged on said hollow tubular body and said clamping ring are provided with exactly aligned bores, and screw means extending through said bores.

3. An outlet in combination according to claim 1, in which the other end portion of said hollow body is provided with a flange.

4. An outlet in combination according to claim 1, in which said clamping ring is of resilient material.

5. An outlet in combination according to claim 1, in which the outer peripheral surface of said clamping ring is provided with protrusions.

* * * * *